US010959242B2

(12) United States Patent
Koyanagi

(10) Patent No.: US 10,959,242 B2
(45) Date of Patent: Mar. 23, 2021

(54) COMMUNICATIONS SYSTEM, BASE STATION, MOBILE STATION, AND COMMUNICATIONS METHOD

(71) Applicant: NEC Corporation, Tokyo (JP)

(72) Inventor: Kenji Koyanagi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/480,378

(22) PCT Filed: Jan. 19, 2018

(86) PCT No.: PCT/JP2018/001607
§ 371 (c)(1),
(2) Date: Jul. 24, 2019

(87) PCT Pub. No.: WO2018/139365
PCT Pub. Date: Aug. 2, 2018

(65) Prior Publication Data
US 2019/0387528 A1   Dec. 19, 2019

(30) Foreign Application Priority Data

Jan. 25, 2017  (JP) .............................. JP2017-011218

(51) Int. Cl.
*H04W 72/08*  (2009.01)
*H04W 76/50*  (2018.01)
(Continued)

(52) U.S. Cl.
CPC ......... *H04W 72/085* (2013.01); *H04L 1/0026* (2013.01); *H04W 24/10* (2013.01); *H04W 72/10* (2013.01); *H04W 76/50* (2018.02)

(58) Field of Classification Search
CPC ... H04W 24/10; H04W 72/085; H04W 72/10; H04W 76/50; H04L 1/0026
See application file for complete search history.

(56) References Cited

U.S. PATENT DOCUMENTS 6,271,772 B1 *  8/2001  Luschi .................. H03M 13/29
                                                     341/51
2009/0305715 A1  12/2009  Barve et al.
(Continued)

FOREIGN PATENT DOCUMENTS

JP   2003-188818 A    7/2003
JP   2010283633 A    12/2010
(Continued)

OTHER PUBLICATIONS

Written Opinion of the International Searching Authority of PCT/JP2018/001607 dated Apr. 10, 2018.
(Continued)

*Primary Examiner* — Wei Zhao
(74) *Attorney, Agent, or Firm* — Sughrue Mion, PLLC

(57) ABSTRACT

A communications system 1 has: an eNB 20 having a feedback conditions control unit 22 that controls feedback conditions in accordance with call priority and a control unit 21 that controls communications with a mobile station 10 on the basis of feedback information that includes reception quality in the mobile station 10 and decoding results for a received call, said feedback conditions being for determining whether or not transmission of the feedback information is necessary; and the mobile station 10 having a priority setting unit 13 that sets a priority level for the mobile station itself, a reception quality measuring unit 11 that measures the reception quality of reference signals from the eNB 20, and a feedback requirement determination unit 12 that determines whether or not transmission of feedback information is required, on the basis of the feedback conditions.

5 Claims, 11 Drawing Sheets

(51) Int. Cl.
  *H04L 1/00*       (2006.01)
  *H04W 24/10*      (2009.01)
  *H04W 72/10*      (2009.01)

(56) References Cited

U.S. PATENT DOCUMENTS

| | | | |
|---|---|---|---|
| 2010/0311430 A1* | 12/2010 | Katayama | H04L 5/0007 |
| | | | 455/450 |
| 2010/0322102 A1 | 12/2010 | Zhou et al. | |
| 2012/0106427 A1 | 5/2012 | Nakae et al. | |
| 2012/0236779 A1 | 9/2012 | Lee et al. | |
| 2012/0282916 A1 | 11/2012 | Futaki et al. | |
| 2013/0022083 A1* | 1/2013 | Vasseur | H04L 12/4035 |
| | | | 375/132 |

FOREIGN PATENT DOCUMENTS

| | | |
|---|---|---|
| JP | 2013503569 A | 1/2013 |
| WO | 2011/010468 A1 | 1/2011 |
| WO | 2011025825 A1 | 3/2011 |
| WO | 2011/083800 A1 | 7/2011 |
| WO | 2016/121567 A1 | 8/2016 |

OTHER PUBLICATIONS

International Search Report of PCT/JP2018/001607 dated Apr. 10, 2019.
Communication dated Dec. 18, 2019 from the European Patent Office in application No. 18744065.6.
Communication dated Sep. 23, 2020, from the Japanese Patent Office in application No. 2018-564534.

* cited by examiner

Fig.2

| ACCESS CLASS | PROVIDER |
|---|---|
| 15 | SYSTEM ADMINISTRATOR |
| 14 | EMERGENCY COMMUNICATION CARRIER (POLICE, FIRE-FIGHTING, MEDICAL) |
| 13 | WATER SUPPLIER, GAS SUPPLIER |
| 12 | SECURITY SERVICE PROVIDER |
| 11 | OTHER PUBLIC SAFETY PROVIDER |
| 10 | USE ONLY IN EMERGENCY COMMUNICATION |
| 0~9 | NON-PUBLIC SAFETY PROVIDER |

Fig.3

| EXAMPLE OF USER TYPE | | PRIORITY |
|---|---|---|
| 1. SYSTEM ADMINISTRATOR | Administrator | 1st (HIGHEST) |
| 2. DISPATCH SUPERVISOR | Dispatch Supervisor | 2nd |
| 3. DISPATCHER | Dispatcher | 3rd |
| 4. FIRST RESPONDER | First Responder | 4th |
| 5. SECOND RESPONDER | Second Responder | 5th (LOWEST) |

Fig.4

| TYPE | PRIORITY | EXPLANATION |
|---|---|---|
| ANNOUNCEMENT COMMUNICATION | 5 | COMMUNICATION TO SELECTED GROUP OR THE LIKE. TRANSMISSION OF RECEPTION CONFIRMATION BY RECEIVER IS NOT REQUIRED. |
| SYSTEM COMMUNICATION | 1 | COMMUNICATION FOR COMMUNICATING WITH ALL USERS. SPECIAL COMMUNICATION BASED ON ANNOUNCEMENT COMMUNICATION. |
| EMERGENCY COMMUNICATION | 2 | EMERGENCY COMMUNICATION USED IN LIFE THREATENING SITUATION. |
| IMPORTANT COMMUNICATION | 3 | COMMUNICATION USED TO NOTIFY OCCURRING RISK IMMEDIATELY. |
| NORMAL COMMUNICATION | 4 | COMMUNICATION IN NORMAL SITUATION (DEFAULT SET VALUE) |

Fig.5

| | SYSTEM ADMINISTRATOR | DISPATCH SUPERVISOR | DISPATCHER | FIRST RESPONDER | SECOND RESPONDER |
|---|---|---|---|---|---|
| SYSTEM ADMINISTRATOR | ○ | ○ | ○ | × | × |
| EMERGENCY COMMUNICATION CARRIER | ○ | ○ | ○ | ○ | ○ |
| WATER SUPPLIER, GAS SUPPLIER | ○ | ○ | × | × | × |
| SECURITY SERVICE PROVIDER | × | × | × | × | × |
| OTHER PUBLIC SAFETY PROVIDER | ○ | ○ | ○ | ○ | × |
| USE ONLY IN EMERGENCY COMMUNICATION | ○ | ○ | ○ | ○ | ○ |
| NON-PUBLIC SAFETY PROVIDER | × | × | × | × | × |

Fig.6

| | SYSTEM ADMINISTRATOR | EMERGENCY COMMUNICATION CARRIER | WATER SUPPLIER, GAS SUPPLIER | SECURITY SERVICE PROVIDER | OTHER PUBLIC SAFETY PROVIDER | USE ONLY IN EMERGENCY COMMUNICATION | NON-PUBLIC SAFETY PROVIDER |
|---|---|---|---|---|---|---|---|
| SYSTEM ADMINISTRATOR | O | O | O | O | O | O | O |
| DISPATCH SUPERVISOR | O | O | O | O | O | O | O |
| DISPATCHER | O | O | O | O | O | O | O |
| FIRST RESPONDER | O | O | O | O | O | O | O |
| SECOND RESPONDER | O | O | O | O | O | O | O |

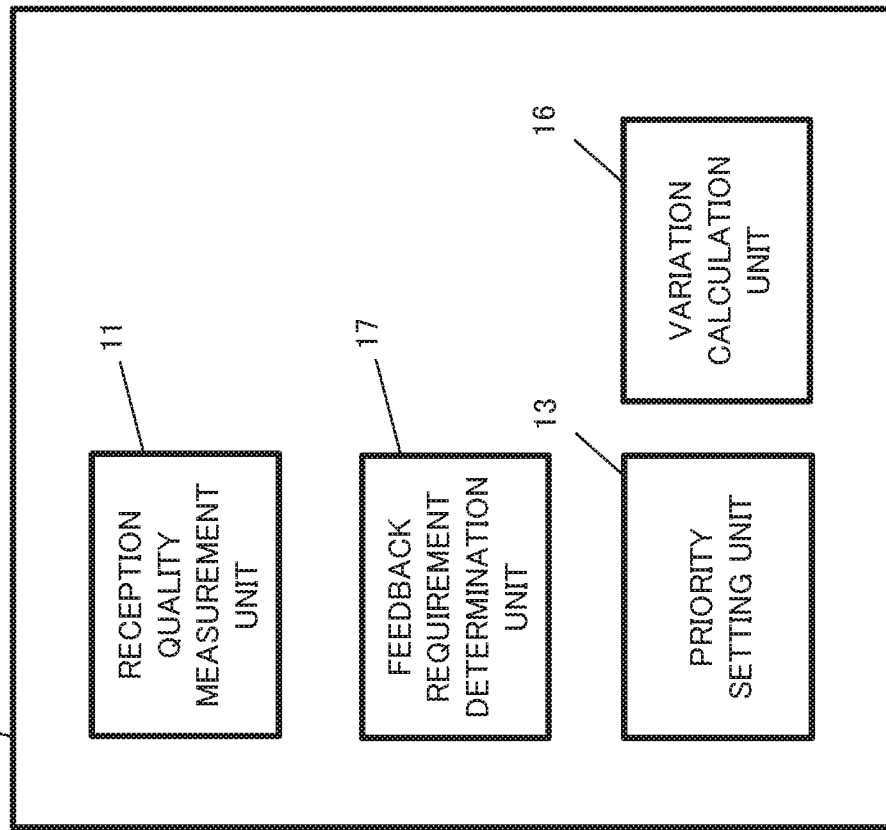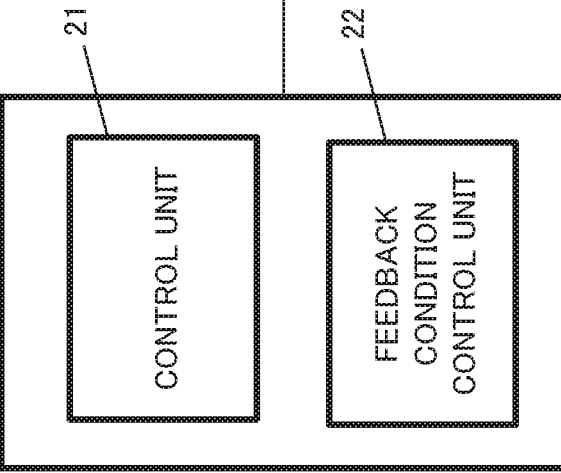
Fig.9

COMMUNICATIONS SYSTEM, BASE STATION, MOBILE STATION, AND COMMUNICATIONS METHOD

CROSS REFERENCE TO RELATED APPLICATIONS

This application is a National Stage of International Application No. PCT/JP2018/001607 filed Jan. 19, 2018, claiming priority based on Japanese Patent Application No. 2017-011218 filed Jan. 25, 2017, the disclosures of which are incorporated herein in their entirety by reference.

TECHNICAL FIELD

The present invention relates to a communications system, a base station, a mobile station, and a communications method, and more particularly, to a communications system for performing group communication with a plurality of mobile stations, a base station, a mobile station, and a communications method.

BACKGROUND ART

As a method for implementing group communication for establishing a call with a plurality of mobile stations in a radio communication architecture of an LTE system, a method is known in which a transmitter performs multimedia broadcast/multicast service (hereinafter referred to as MBMS) for performing communication by using a radio resource common to a plurality of mobile stations. For example, PTL 1 discloses a mobile communications system that performs multimedia broadcast/multicast service.

The mobile communications system disclosed in PTL 1 receives channel quality information about each of user terminals from a plurality of user terminals, in order that a base station controls transmission power of the plurality of user terminals for broadcasting. Further, the mobile communications system controls the transmission power of the base station by increasing or decreasing the transmission power of the base station, based on information about the poorest channel quality in the channel quality information received from the plurality of user terminals. In a sequence in the MBMS, a mobile station receives a reference signal constantly transmitted from the base station (evolved Node B (eNB)). The mobile station periodically feeds back, to the eNB, reception quality (channel quality indicator, hereinafter referred to as CQI) measured from the received downlink reference signal. The mobile station feeds back to the eNB by each different physical uplink control channel (PUCCH). Based on the CQIs received from all mobile stations, an MCS of a physical multicast channel (PMCH) or a physical downlink shared channel (PDSCH) is determined, according to a mobile station with a lowest quality. The term "MCS" refers to a combination of a modulation method and a coding rate for error correction.

In addition, a method is known in which a transmitter establishes communication with each mobile station by a different radio resource using so-called unicast. In the unicast, a mobile station also receives a reference signal constantly transmitted from a base station (evolved Node B (eNB)), and periodically feeds back, to the eNB, a CQI measured from a downlink reference signal received by the mobile station by using a different physical uplink control channel (PUCCH). The eNB determines a modulation and coding scheme (MCS) of a PDSCH being transmitted to each of mobile stations, based on the CQI for each of mobile stations.

When group communication is transmitted from a transmitter, the eNB transmits a group communication call to mobile stations serving as receivers by using the determined MCS. When receiving the group communication call, each mobile station decodes the received call. Each of mobile stations feeds back an acknowledgement (Ack)/non-acknowledgement (Nack), as a decoding result, to the eNB by using each different PUCCH. The eNB determines whether to perform retransmission, based on Ack/Nack from all mobile stations. For example, when receiving Nack from a predetermined number or more of the mobile stations, the eNB performs retransmission.

Thus, in the group communication, all mobile stations feed back the CQI and Ack/Nack by using PUCCHs. Accordingly, the number of PUCCHs corresponding to the number of mobile stations is required, which leads to a shortage of radio resources for the PUCCHs. In addition, it is necessary for the eNB to perform processing of allocating radio resources for PUCCHs and processing of receiving PUCCHs on all mobile stations.

In order to solve this problem, a mobile communications system is proposed for performing control in such a way that mobile station(s) only for satisfying a feedback condition perform feedback in, for example, PTL 2. In the mobile communications system in PTL 2, each of the mobile stations includes a reception unit that receives multicast/broadcast data to be transmitted to a plurality of mobile stations from an eNB by using the same downlink radio resource. Further, in the mobile communications system in PTL 2, each of the mobile stations includes a transmission unit that transmits, to the eNB, feedback information about a downlink when a radio state between the mobile station and the eNB is lower than a threshold value, and a control unit that interrupts transmission of feedback information when the radio state is higher than a threshold value.

CITATION LIST

Patent Literature

[PTL 1] Japanese Unexamined Patent Application Publication No. 2003-188818
[PTL 2] International Patent Publication No. WO 2016/121567

SUMMARY OF INVENTION

Technical Problem

In a case where group communication is performed in a group of dispatched fire engines, it is considered that each terminal in the group of dispatched fire engines is almost moving. Accordingly, large variations occur in a radio state. Mobile communications systems disclosed in PTL 1 and PTL 2 have a configuration in which emergency communication or the like and group communication of mobile stations with a high priority are not considered, and transmission of feedback information is interrupted when the radio state is higher than the threshold value. Therefore, when a radio state between an eNB and the mobile station varies greatly immediately after the eNB receives the CQI, there is a possibility that the group communication may be interrupted until a bandwidth is adjusted by the next CQI.

An object of the present invention is to provide a communications system, a base station, a mobile station, and a communications method which are capable of preventing a shortage of radio resources for a PUCCH and preventing an interruption of group communication with a high degree of importance.

Solution to Problem

A communications system, according to one aspect of the present invention, which performs communication between a mobile station and a base station, wherein the base station includes: a feedback condition control unit for controlling, according to a priority of a call, a feedback condition as a condition for the mobile station to determine whether or not transmission of feedback information is required, the feedback information including a reception quality of the mobile station and a result of decoding the received call; and a control unit for controlling communication with the mobile station, based on the feedback information, and the mobile station includes: a priority setting unit for setting a priority of the mobile station; a reception quality measurement unit for measuring a reception quality of a reference signal transmitted from the base station; and a feedback requirement determination unit for receiving the feedback condition from the base station, and determining whether or not transmission of the feedback information is required, based on the feedback condition.

A base station, according to one aspect of the present invention, includes: a feedback condition control unit for controlling, according to a priority of a call, a feedback condition as a condition for a mobile station to determine whether or not transmission of feedback information is required, the feedback information including a reception quality of the mobile station and a result of decoding the received call; and a control unit for controlling communication with the mobile station, based on the feedback information.

A mobile station, according to one aspect of the present invention, includes: a priority setting unit for setting a priority of the mobile station; a reception quality measurement unit for measuring a reception quality of a reference signal transmitted from a base station; and a feedback requirement determination unit for receiving, from the base station, a feedback condition as a condition to determine whether transmission of feedback information is required, and determining whether or not transmission of the feedback information is required, based on the feedback condition, the feedback information including the reception quality and a result of decoding a received call.

A communications method for a base station, according to one aspect of the present invention, the method includes: controlling communication with a mobile station, based on feedback information, by controlling, according to a priority of a call, a feedback condition as a condition for the mobile station to determine whether or not transmission of the feedback information is required, the feedback information including a reception quality in the mobile station and a result of decoding of the received call.

A communications method for a mobile station, according to one aspect of the present invention, the method includes: setting a priority of the mobile station; measuring a reception quality of a reference signal transmitted from a base station; and receiving, from the base station, a feedback condition as a condition to determine whether or not transmission of feedback information is required, and determining whether or not transmission of the feedback information is required, based on the feedback condition, the feedback information including the reception quality and a result of decoding a received call.

Advantageous Effects of Invention

According to the present invention, it is possible to provide a communications system, a base station, a mobile station, and a communications method which are capable of preventing a shortage of radio resources for a PUCCH and preventing an interruption of group communication with a high priority.

BRIEF DESCRIPTION OF DRAWINGS

FIG. 2 is a table illustrating one example of an access class set by a priority setting unit illustrated in FIG. 1.

FIG. 3 is a table illustrating one example of a user type set by the priority setting unit illustrated in FIG. 1.

FIG. 4 is a table illustrating one example of a priority of a call set by the priority setting unit illustrated in FIG. 1.

FIG. 5 is a table illustrating one example of a feedback condition.

FIG. 6 is a table illustrating one example of a feedback condition when the priority of the call included in a received signal is high.

FIG. 9 is a block diagram illustrating a configuration according to a second example embodiment.

EXAMPLE EMBODIMENT

Figure 1:
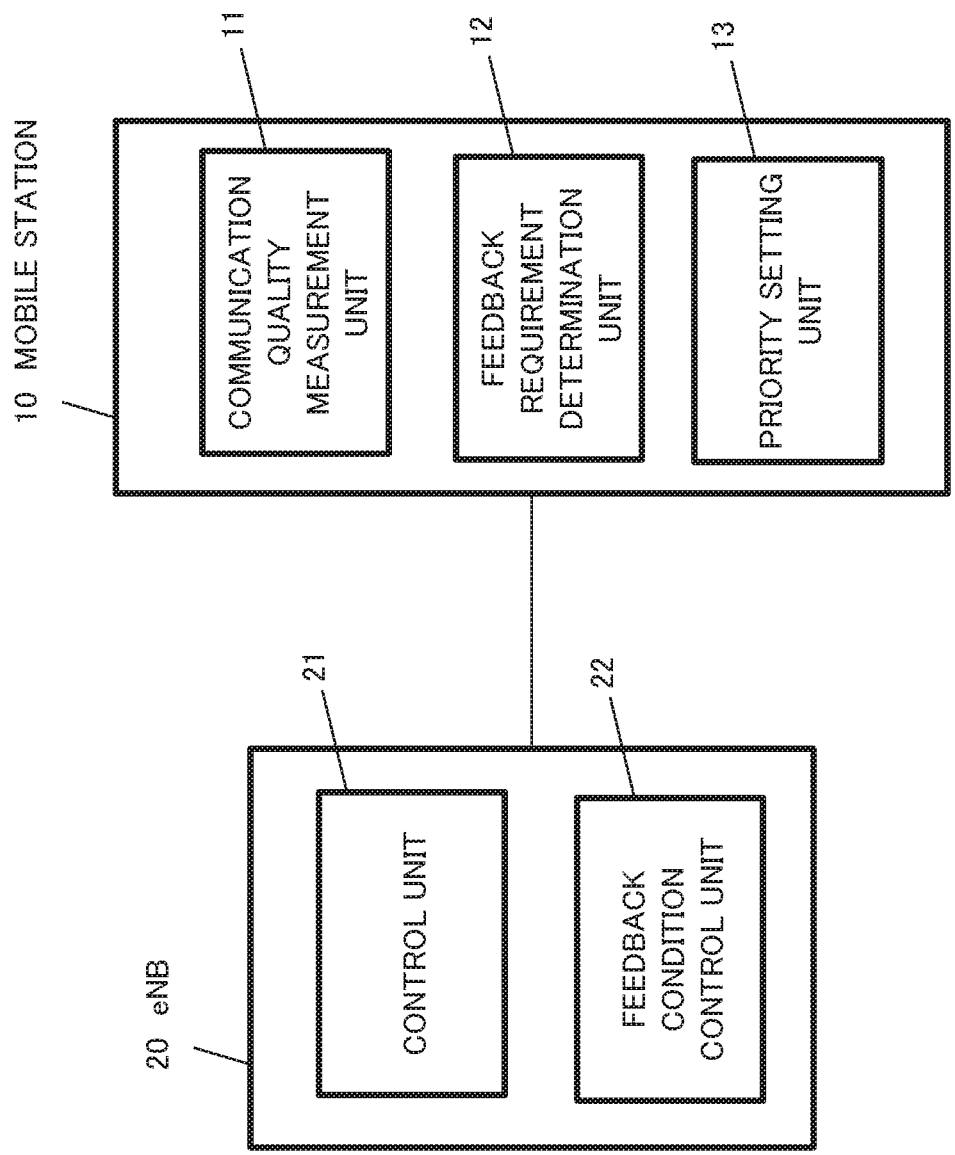
FIG. 1 is a block diagram illustrating a configuration of a first example embodiment.

A communications apparatus according to the present invention will be described below with reference to the drawings. FIG. 1 is a block diagram illustrating a configuration of the communications apparatus according to a first example embodiment of the present invention. As illustrated in FIG. 1, a mobile station 10 of a communications system 1 according to the present example embodiment includes a reception quality measurement unit 11, a feedback requirement determination unit 12, and a priority setting unit 13. Further, a base station (eNB) 20 of the communications system 1 according to the present example embodiment includes a control unit 21 and a feedback condition control unit 22.

The feedback condition control unit 22 of the eNB 20 notifies the mobile station 10 of a feedback condition, and controls mobile station(s) 10 only for satisfying the condition feeds back. The feedback condition indicates a mobile station that is caused to feed back a reception quality (channel quality indicator (CQI)) and acknowledgement (Ack)/non-acknowledgement (Nack) indicating a result of decoding a received call. When a terminal is compatible with reception of multiple input multiple output (MIMO), the reception quality includes a precoding matrix indicator (PMI) and a rank indicator (RI). Note that the feedback condition may be set in advance in the mobile station.

The reception quality measurement unit 11 of the mobile station 10 receives a reference signal constantly transmitted from the eNB 20, and measures the CQI. The feedback requirement determination unit 12 determines, based on the feedback condition notified from the eNB 20, whether a local station is a mobile station that transmits feedback information. When the local station is a mobile station that transmits feedback information, the reception quality measurement unit 11 transmits the measured CQI to the eNB 10.

The control unit 21 of the eNB 20 uses radio resources common to all mobile stations, and uses different physical channels by a MBMS system. In the case of MBSFN, PMCH is used. In the case of SC-PTM, PDSCH is used. The term "SC-PTM" used herein refers to a function for broadcasting to a plurality of terminals within one cell specified in the 3rd generation partnership project (3GPP) Release13. The term "MBSFN" refers to a function for synchronously transmitting the same signal by a plurality of eNBs specified in the 3GPP Release 9.

The control unit 21 of the eNB 20 determines modulation and coding scheme (MCS) according to a mobile station with a lowest quality, based on the CQI. In the MBMS sequence, the control unit 21 determines the MCS of physical multicast channel (PMCH) or physical downlink shared channel (PDSCH). The term "MCS" refers to a combination of a modulation method and a coding rate for error correction. Examples of the modulation method include QPSK, 16QAM, and 64QAM. Further, the control unit 21 of the eNB 20 controls the amount of data to be transmitted and radio resources (resource block (RB)) used for transmission, based on the CQI. When group communication is provided from a transmitter, the control unit 21 of the eNB 20 transmits a group communication call to mobile stations serving as receivers by using the determined MCS.

Upon receiving a group communication call, the feedback requirement determination unit 12 of the mobile station 10 decodes the received call. In a case where the local station is a mobile station that transmits feedback information, upon receiving a call from the eNB 20, the feedback requirement determination unit 12 feeds back Acknowledgement (Ack)/Non-acknowledgement (Nack), which indicates a result of decoding the received call, to the eNB 10.

Also, in a unicast sequence, when the local station is a mobile station that transmits feedback information, the feedback requirement determination unit 12 of the mobile station 10 transmits, to the eNB 20, the reception quality (CQI) measured from a downlink reference signal and feedback information including Ack/Nack indicating a result of decoding the received call.

The control unit 21 of the eNB 20 controls retransmission of the group communication call, based on Ack/Nack from the mobile station 10.

The priority setting unit 13 included in the mobile station 10 according to the present example embodiment includes a priority of the mobile station 10 in the transmitted signal of a transmitted call, when the group communication is transmitted. Examples of the priority of the mobile station include an access class set in a SIM card to be installed in the mobile station 10, and a user type of a user who uses the mobile station 10. FIG. 2 is a table illustrating one example of the access class set by the priority setting unit illustrated in FIG. 1. FIG. 3 is a table illustrating one example of the user type set by the priority setting unit illustrate in FIG. 1. Note that the user type is information corresponding to a participant type included in a MCPTT user profile data described in 3GPP TS23.179 B3 (MCPTT user profile data), a list of group members described in 3GPP TS23.179 B4 (group configuration data), or the like. The participant type is information stored in a user information management server, which is connected to an LTE core network via the eNB or without passing through the eNB, by an apparatus of a mission critical push to talk (MCPTT) administrator or the like, and manages MCPTT user profile data. In addition, the information of the participant type is notified to the mobile station 10 or the like from the user information management server, and is set by the priority setting unit 13 in the mobile station 10.

Further, the priority setting unit 13 also includes the priority of the call in the transmitted signal of the transmitted call, when the mobile station 10 transmits the group communication. FIG. 4 is a table illustrating one example of the priority of the call set by the priority setting unit illustrated in FIG. 1. The priority of the call refers to a priority indicating whether the call is emergency communication by dialing, for example, 110 or 119. The priority setting unit 13 sets a high degree of emergency in emergency communication by dialing, for example, 119 or 110. Note that the priority of the call corresponds to emergency indicator described in 3GPP TS23.179 10.6.2.2.1 (MCPTT emergency group callrequest).

Upon receiving the transmitted signal from the mobile station 10, which is the transmitter, the feedback condition control unit 22 controls the feedback condition according to the priority of the mobile station 10 serving as the transmitter illustrated in FIGS. 2 and 3 and the priority of the call illustrated in FIG. 4. The feedback condition control unit 22 sets different feedback condition according to, for example, the priority of the call and the priority of the mobile station 10 serving as the transmitter.

The feedback condition control unit 22 transmits, to the mobile station 10, the feedback condition according to the priority of the call and the priority of the mobile station 10 serving as the transmitter. The feedback condition control unit 22 sets, for example, in the case of the transmitted signal with a high call priority, feedback conditions to be transmitted to the receiver as feedback conditions to be fed back to all mobile stations 10. The feedback condition control unit 22 sets, for example, in the case of the transmitted signal with a low call priority, feedback conditions to be transmitted to the receiver feedback conditions to be fed back only to mobile stations of some of the access classes or user types according to the priority.

The feedback condition indicates whether or not a feedback is required for the priority of the mobile station 10. As the priority of the mobile station, for example, a combination of the access class illustrated in FIG. 3 and the user type illustrated in FIG. 4 may be used. FIG. 5 is a table illustrating one example of feedback conditions. In FIG. 5, "○" indicates that feedback is performed, and "x" indicates that feedback is not required. As illustrated in FIG. 5, for each access class, the setting can be made in such a way that feedback of all user types is not required, feedback of some of the user types is not required, or all user types are fed back. When group communication in one access class is performed, the setting can be made in such a way that feedback of access classes other than a specific access class are not required, and all user types of a specific access class are fed back.

Further, FIG. 6 is a table illustrating one example of feedback condition when the priority of the call included in the received signal is high. As illustrated in FIG. 6, for example, when the priority of the call is high, the setting can be made in such a way that all user types of all access classes are fed back.

Note that, although FIGS. 5 and 6 illustrate examples of feedback conditions indicating whether or not feedback is required for each user type, the feedback condition is not limited to these examples. A numerical value may be used as each user type, and a table of feedback conditions may be used in which each access class is associated with the numerical value of each user type to be fed back. For example, "1" represents a system administrator, "2" represents a dispatch supervisor, "3" represents a dispatcher, "4" represents a first responder, and "5" represents a second responder. For example, as illustrated in FIG. 5, in the access class of "water supplier, gas supplier", when the feedback conditions are fed back only to the system administrator and the dispatch supervisor, "1, 2" may be set as the feedback conditions corresponding to the access class.

The priority may be set to high as the value is small, and a table may be used in which each access class is associated with a maximum value of each user type to be fed back. Similarly to the above, in the access class of "water supplier, gas supplier", when the feedback conditions are fed back only to the system administrator and the dispatch supervisor, "2" may be set as the feedback conditions corresponding to the access class.

Figure 7:
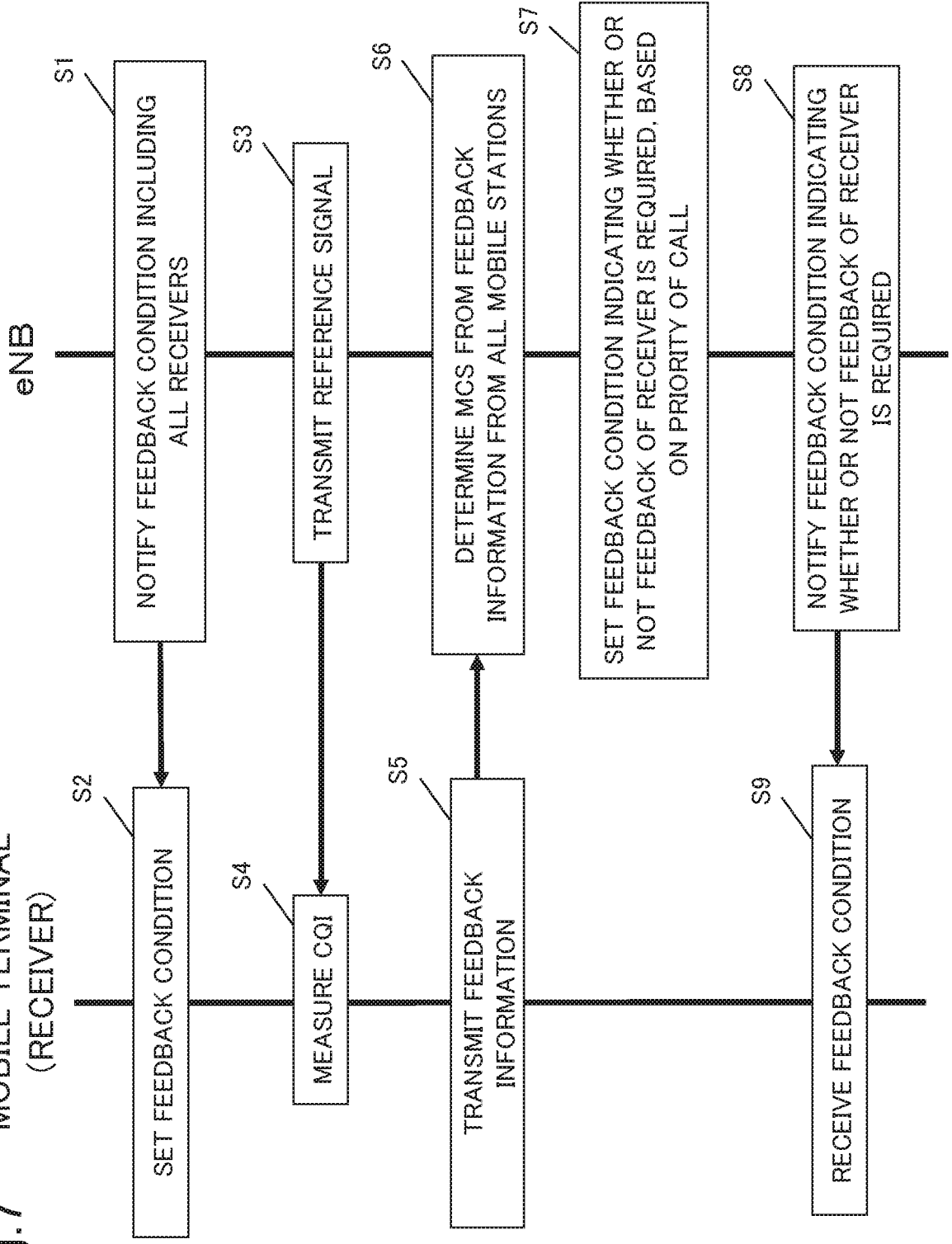
FIG. 7 is a flowchart illustrating an operation of notifying a feedback condition in FIG. 1.

Next, an operation according to the present example embodiment will be described. FIG. 7 is a flowchart illustrating an operation of notifying feedback condition in FIG. 1. Upon receiving a transmitted call of group communication from the transmitter, the feedback condition control unit 22 transmits, to the mobile station 10 as illustrated in FIG. 7, the feedback condition controlled according to the priority of the mobile station 10, which is the transmitter illustrated in FIGS. 2 and 3, and the priority of the call illustrated in FIG. 4.

When the call is transmitted to the mobile station serving as the receiver of the group communication, the feedback condition control unit 22 of the eNB 20 first determines the MCS of PMCH or PDSCH in such a way that all receivers can be received, sets a feedback condition controlled in such a way as to be fed back by all receivers, and notifies the mobile stations 10 serving as the receivers of the feedback conditions (step S1).

The mobile station 10 serving as the receiver receives the notified feedback condition, and sets the feedback condition to the feedback requirement determination unit 12 (step S2).

Next, when the eNB 20 transmits the reference signal (step S3), the mobile stations 10 serving as all receivers measure the CQI (step S4), and the mobile stations 10 serving as all receivers transmit feedback information, based on the feedback condition (step S5).

The control unit 21 of the eNB 20 determines the MCS used for transmitting a group communication call, based on the feedback information received from the mobile stations 10 serving as all receivers (step S6).

The feedback condition control unit 22 checks the priority of the group communication call transmitted thereafter, and sets the feedback condition, based on the priority of the transmitted call (step S7). Then, the feedback condition control unit 22 notifies the feedback condition including a threshold value corresponding to the priority of the receiver (step S8). The mobile station 10 serving as the receiver, sets the notified feedback condition to the feedback requirement determination unit 12 (step S9).

Figure 8:
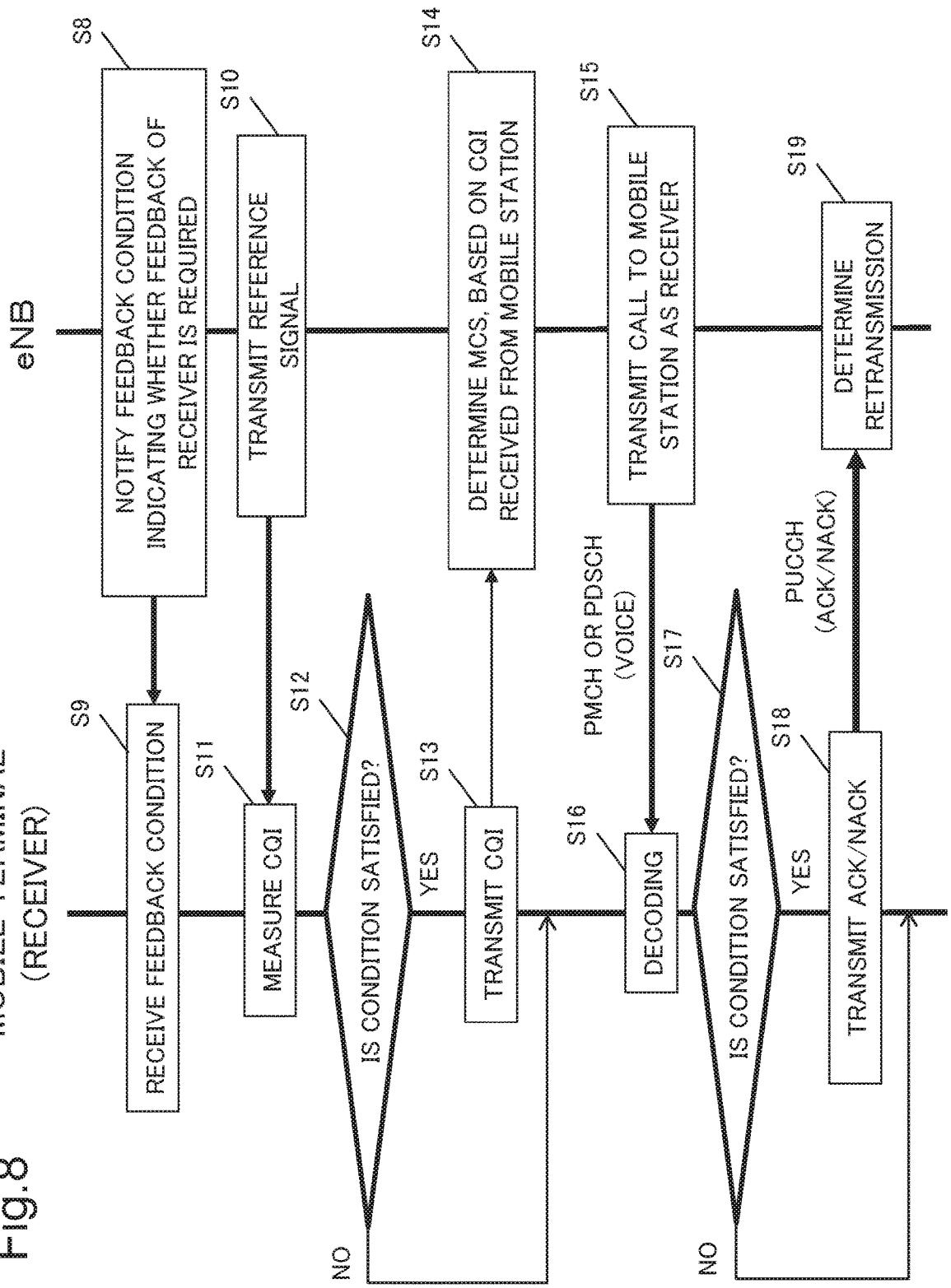
FIG. 8 is a flowchart illustrating an operation after a feedback condition is notified in FIG. 1.

FIG. 8 is a flowchart illustrating an operation after the feedback condition is notified in FIG. 1.

In step S8, the feedback condition including the threshold value corresponding to the priority of the mobile station 10 serving as the receiver is notified of the mobile station 10 serving as the receiver, and in step S9, the mobile station 10 sets the notified feedback condition to the feedback requirement determination unit 12. After that, when the eNB 20 transmits the reference signal (step S10), the mobile station 10 serving as the receiver measures the CQI (step S11), and the feedback requirement determination unit 12 of the mobile station 10 refers to the priority of itself set in the priority setting unit 13, and determines whether to perform feedback (step S12). In step S12, the measured CQI in step S11 is transmitted (step S13) when it is determined that the feedback condition is satisfied, and the measured CQI is not transmitted when the feedback condition is not satisfied. The control unit 21 of the eNB 20 determines the MCS, based on the CQI received from the mobile station 10 that satisfies the feedback condition (step S14). After that, the control unit 21 of the eNB 20 transmits the call to the mobile station 10 serving as the receiver (step S15).

While the mobile station 10 serving as the receiver that has received the call decodes the call (step S16), the feedback requirement determination unit 12 of the mobile station 10 refers to the priority set in the priority setting unit 13, and determines whether to perform feedback (step S17). In step S11, Ack/Nack is transmitted as a result of decoding the received call (step S18) when it is determined that the feedback condition is satisfied, and Ack/Nack is not transmitted when the feedback condition is not satisfied. The control unit 21 of the eNB 20 controls retransmission of the call, based on Ack/Nack received from the mobile station 10 that satisfies the feedback condition (step S19).

As described above, according to the present example embodiment, the feedback condition including the threshold value corresponding to the priority of the receiver is set, based on the priority of the call or the like transmitted from the eNB. Further, the mobile station serving as the receiver refers to the set priority of itself. When it is determined that the feedback condition is satisfied, feedback information is transmitted, and when the feedback condition is not satisfied, feedback information is not transmitted. Accordingly, in a case where the priority of the call is high and a variation in the radio state of the mobile station is large, like a group of dispatched fire engines, for example, feedback information is collected from all mobile stations, and thereby it is capable of preventing an interruption of communication. Further, according to the configuration described above, when the priority of the call is low, the priority of the mobile station to which the feedback information is transmitted is limited, and thereby it is capable of reducing the number of mobile stations to which the feedback information is transmitted and preventing a shortage of radio resources for PUCCHs.

Note that the mobile station 10 may calculate the magnitude of a variation of a reception quality from a previously measured value, and may transmit the reception quality (CQI) in consideration of the magnitude of the variation when the variation is large. FIG. 9 is a block diagram illustrating a configuration according to a second example embodiment. A mobile station 15 of a communications system 2 according to the present example embodiment includes a variation calculation unit 16 that calculates the magnitude of a variation of a reception quality from previously measured values. Further, a feedback requirement determination unit 17 according to the present example embodiment determines whether the variation is greater than a predetermined threshold value set in advance. The second example embodiment differs from the first example embodiment in that, even in a case where the feedback condition is not satisfied, the feedback information is transmitted when it is determined that the variation is large.

Figure 10:
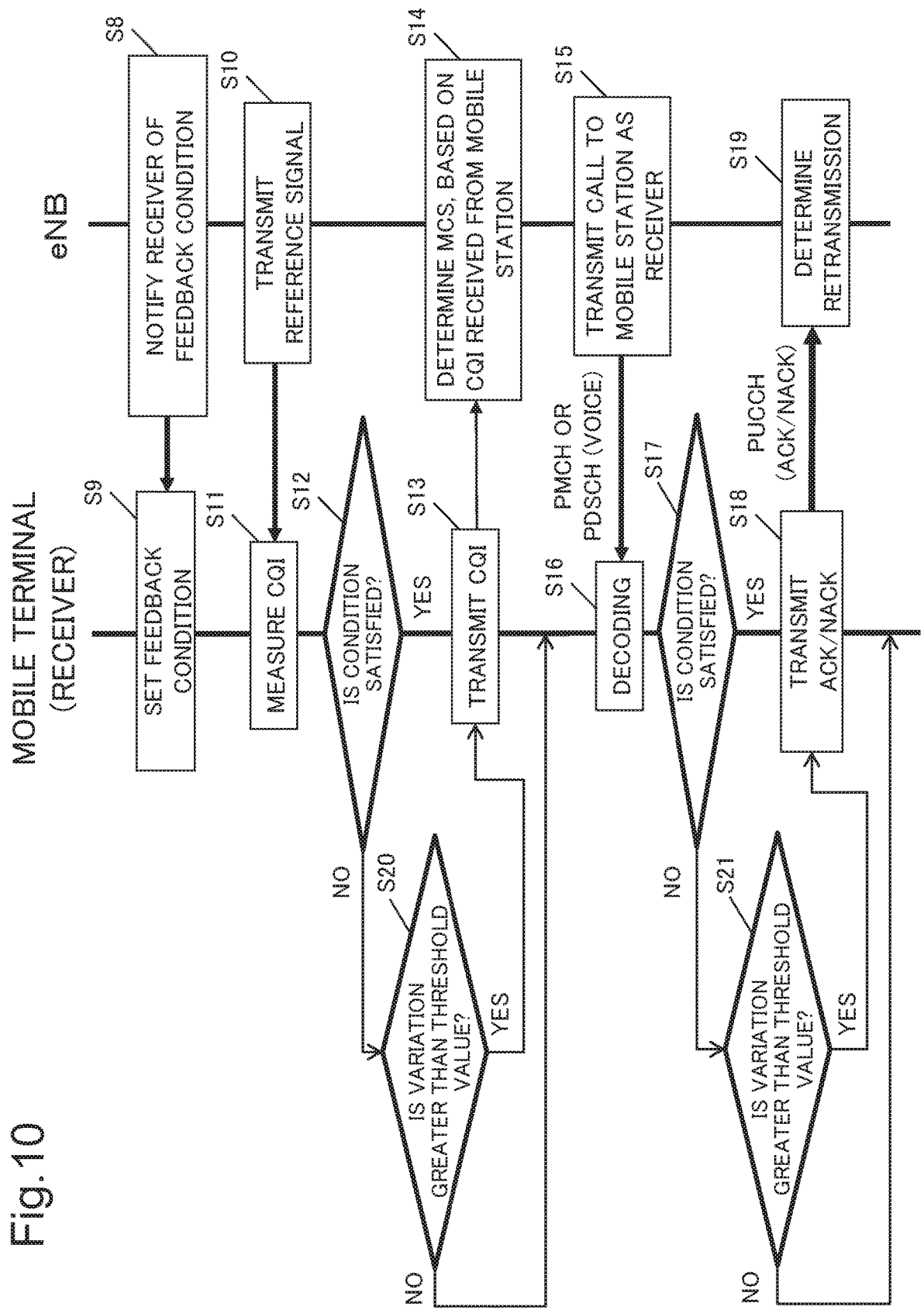
FIG. 10 is a flowchart illustrating an operation after a feedback condition is notified in FIG. 9.

FIG. 10 is a flowchart illustrating an operation after the feedback condition is notified in FIG. 9. In the present example embodiment, similar to the first example embodiment, in step S8, the mobile station 15 serving as the receiver is notified of the feedback condition based on the priority of the receiver, and in step S9, the mobile station 15 serving as the receiver sets the notified feedback condition to the feedback requirement determination unit 17. After that, when the eNB 20 transmits the reference signal (step S10), the mobile station 15 serving as the receiver measures the CQI (step S11), and the feedback requirement determination unit 17 of the mobile station 15 refers to the priority set in the priority setting unit 13, and determines whether to perform feedback (step S12).

In step S12, when it is determined that the feedback condition is satisfied, the feedback requirement determination unit 17 of the mobile station 15 transmits the CQI measured in step S11 (step S13). In the present example embodiment, when the feedback condition is not satisfied, the variation calculation unit 16 further calculates the magnitude of the variation of the reception quality from the previously measured values, and determines whether the variation is greater than the threshold value set in advance (step S20). When the variation is not greater than the threshold value, the CQI is not transmitted. When it is determined that the variation is greater than the predetermined threshold value, the processing proceeds to step S13 to transmit the measured CQI, and the control unit 21 of the eNB 20 determines the MCS, based on the CQI received from the mobile station 15 that satisfies the feedback condition (step S14).

After that, the control unit 21 of the eNB 20 transmits the call to the mobile station 15 serving as the receiver (step S15), and the mobile station 15 serving as the receiver that has received the call decodes the call (step S16). Then, the feedback requirement determination unit 17 of the mobile station 15 refers to the priority set in the priority setting unit 13, and determines whether to perform feedback (step S17). In step S17, when it is determined that the feedback condition is satisfied, the feedback requirement determination unit 17 of the mobile station 15 transmits Ack/Nack as a result of decoding the received call (step S18). In the present example embodiment, when the feedback condition is not satisfied, the variation calculation unit 16 further calculates the magnitude of the variation of the reception quality from the previously measured values, and determines whether the variation is greater than the predetermined threshold value set in advance (step S20). When the variation is not greater than the threshold value, no result is transmitted. When it is determined that the variation is greater than the predetermined threshold value, the processing proceeds to step S18 to transmit the result (Ack/Nack) of decoding the received call. The control unit 21 of the eNB 20 controls retransmission of the call, based on Ack/Nack received from the mobile station 15 that satisfies the feedback condition (step S19).

With this configuration, when the radio state of the mobile station that has not been originally considered is deteriorated, the eNB determines the MCS in consideration of the mobile station in the deteriorated conditions, therefore the effect of preventing an interruption of communication can be improved.

It is also possible to employ a configuration in which feedback information is transmitted not only when the variation of the CQI is large, but also when the moving speed of the mobile station is high, even in a case where the feedback condition is not satisfied. Further, it is also possible to employ a configuration in which feedback information is transmitted when an environment in which the mobile station is present, for example, in bad weather, even in the case where the feedback condition is not satisfied. Furthermore, it is also possible to employ a configuration in which feedback information is transmitted when previous reception qualities (CQIs) in a period from a current time to a time before a predetermined period exceeds the feedback condition a predetermined number of times, even in the case where the feedback condition is not satisfied.

Also, with this configuration, effects similar to those of the second example embodiment can be obtained.

Further, as a modified example of the second example embodiment, it is possible to employ a configuration in which when the feedback requirement determination unit 17 determines that the variation is greater than the predetermined threshold value, a CQI lower than a measured value is predicted and transmitted in consideration of the variation.

Figure 11:
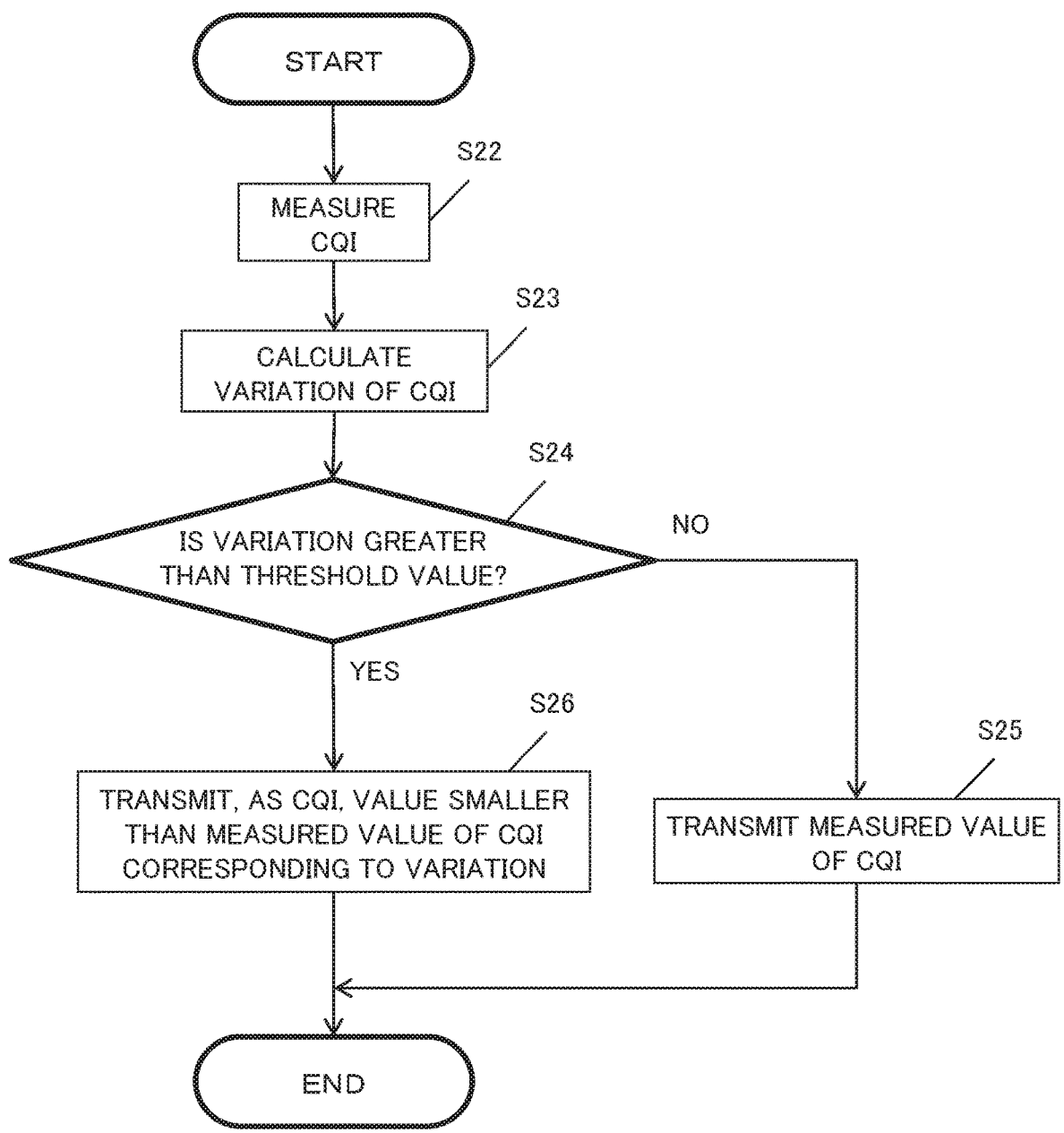
FIG. 11 is a flowchart illustrating an operation of CQI transmission according to a modified example of FIG. 9.

FIG. 11 is a flowchart illustrating an operation of CQI transmission according to a modified example of FIG. 9. First, the reception quality measurement unit 11 receives the reference signal from the eNB 20, and measures the CQI (step S22). Next, the variation calculation unit 16 calculates the magnitude of the variation of the CQI from the previously measured values (step S23). Further, the feedback requirement determination unit 17 determines whether the variation of the CQI is greater than the predetermined threshold value set in advance (step S24).

When the feedback requirement determination unit 17 does not determine that the variation is greater than the predetermined threshold value, the feedback requirement determination unit 17 transmits the measured value of the CQI to the eNB 20 (step S25). When it is determined that the variation is greater than the predetermined threshold value, the CQI that is lower than the measured value is predicted and transmitted in consideration of the variation (step S26).

According to the configuration described above, the eNB determines the MCS, based on a CQI lower than a measured value, when the variation in radio state of the mobile station is large. Consequently, the effect of preventing an interruption of communication can be improved as compared with a case where the measured value of the CQI is used.

The whole or part of the example embodiments disclosed above can be described as, but not limited to, the following supplementary notes.

[Supplementary Note 1]

A communications system that performs communication between a mobile station and a base station, wherein the base station comprises:

a feedback condition control unit for controlling, according to a priority of a call, a feedback condition as a condition for the mobile station to determine whether or not transmission of feedback information is required, the feedback information including a reception quality of the mobile station and a result of decoding the received call; and a control unit for controlling communication with the mobile station, based on the feedback information, and the mobile station comprises:

a priority setting unit for setting a priority of the mobile station;

a reception quality measurement unit for measuring a reception quality of a reference signal transmitted from the base station; and a feedback requirement determination unit for receiving the feedback condition from the base station, and determining whether or not transmission of the feedback information is required, based on the feedback condition.

[Supplementary Note 2]

The communications system according to Supplementary Note 1, wherein the priority of the mobile station is information including at least one of an access class, a participant type, and an emergency indicator.

[Supplementary Note 3]

A base station comprising:

a feedback condition control unit for controlling, according to a priority of a call, a feedback condition as a condition for a mobile station to determine whether or not transmission of feedback information is required, the feedback information including a reception quality of the mobile station and a result of decoding the received call; and a control unit for controlling communication with the mobile station, based on the feedback information.

[Supplementary Note 4]

The base station according to Supplementary Note 3, wherein the feedback condition indicates whether or not transmission of the feedback information is required for a priority of the mobile station.

[Supplementary Note 5]

The base station according to Supplementary Note 3 or 4, wherein the feedback condition control unit controls the feedback condition according to a priority of a mobile station serving as a transmitter.

[Supplementary Note 6]

A mobile station comprising:

a priority setting unit for setting a priority of the mobile station;

a reception quality measurement unit for measuring a reception quality of a reference signal transmitted from a base station; and a feedback requirement determination unit for receiving, from the base station, a feedback condition as a condition to determine whether transmission of feedback information is required, and determining whether or not transmission of the feedback information is required, based on the feedback condition, the feedback information including the reception quality and a result of decoding a received call.

[Supplementary Note 7]

The mobile station according to Supplementary Note 6, further comprising a variation calculation unit for calculating a magnitude of a variation of the reception quality, wherein the feedback requirement determination unit determines whether or not transmission of the feedback information is required in consideration of a magnitude of the variation.

[Supplementary Note 8]

The mobile station according to Supplementary Note 7, wherein the feedback requirement determination unit transmits the feedback information, when the magnitude of the variation is greater than a predetermined threshold value, even in a case where the feedback condition is not satisfied.

[Supplementary Note 9]

The mobile station according to Supplementary Note 6 or 7, wherein the variation calculation unit calculates a moving speed of the mobile station, and the feedback requirement determination unit determines whether or not transmission of the feedback information is required in consideration of the moving speed.

[Supplementary Note 10]

A communications method for a base station, the method comprising:

controlling communication with a mobile station, based on feedback information, by controlling, according to a priority of a call, a feedback condition as a condition for the mobile station to determine whether or not transmission of the feedback information is required, the feedback information including a reception quality in the mobile station and a result of decoding of the received call.

[Supplementary Note 11]

A communications method for a mobile station, the method comprising:

setting a priority of the mobile station;

measuring a reception quality of a reference signal transmitted from a base station; and receiving, from the base station, a feedback condition as a condition to determine whether or not transmission of feedback information is required, and determining whether or not transmission of the feedback information is required, based on the feedback condition, the feedback information including the reception quality and a result of decoding a received call.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST 1, 2 Communications system
10, 15 Mobile station
20 eNB
11 Reception quality measurement unit
12, 17 Feedback requirement determination unit
13 Priority setting unit
16 Variation calculation unit
21 Control unit
22 Feedback condition control unit

The invention claimed is:

1. A communications system that performs communication between a mobile station and a base station, wherein
the base station comprises:
a feedback condition control unit configured to control, according to a priority of a call, a feedback condition as a condition for the mobile station to determine when transmission of feedback information is required, the feedback information including a reception quality of the mobile station and a result of decoding the received call; and
a control unit configured to control communication with the mobile station, based on the feedback information, and
the mobile station comprises:
a priority setting unit configured to set a priority of the mobile station;
a reception quality measurement unit configured to measure a reception quality of a reference signal transmitted from the base station; and
a feedback requirement determination unit configured to receive the feedback condition from the base station, and to determine when transmission of the feedback information is required, based on the feedback condition.

2. The communications system according to claim 1, wherein the priority of the mobile station is information including at least one of an access class, a participant type, and an emergency indicator.

3. A mobile station comprising:
- a priority setting unit configured to set a priority of the mobile station;
- a reception quality measurement unit configured to measure a reception quality of a reference signal transmitted from a base station; and
- a feedback requirement determination unit configured to receive, from the base station, a feedback condition as a condition to determine whether transmission of feedback information is required, and to determine when transmission of the feedback information is required, based on the feedback condition, the feedback information including the reception quality and a result of decoding a received call.

4. The mobile station according to claim 3, further comprising
- a variation calculation unit configured to calculate a magnitude of a variation of the reception quality, wherein
- the feedback requirement determination unit determines when transmission of the feedback information is required in consideration of a magnitude of the variation.

5. The mobile station according to claim 4, wherein the feedback requirement determination unit transmits the feedback information, when the magnitude of the variation is greater than a predetermined threshold value, even in a case where the feedback condition is not satisfied.

* * * * *